(12) United States Patent
Caldwell

(10) Patent No.: US 6,491,354 B1
(45) Date of Patent: Dec. 10, 2002

(54) BLEED VALVE WITH PUMP BYPASS FEATURE

(75) Inventor: William P. Caldwell, South Lyon, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/697,936

(22) Filed: Oct. 27, 2000

(51) Int. Cl.[7] .............................................. B60T 13/18
(52) U.S. Cl. ................ 303/11; 303/116.1; 303/DIG. 11
(58) Field of Search .......................... 303/10, 11, 116.1, 303/DIG. 11, 119.1

(56) References Cited

U.S. PATENT DOCUMENTS

| | | | | |
|---|---|---|---|---|
| 4,883,328 A | * | 11/1989 | Burgdorf et al. | 303/116.1 |
| 5,188,435 A | * | 2/1993 | Willman | 303/113.2 |
| 5,857,753 A | | 1/1999 | Gowda | |
| 5,882,090 A | * | 3/1999 | Ganzel | 303/113.2 |
| 5,921,638 A | * | 7/1999 | Higashimura et al. | 303/116.1 |
| 5,984,430 A | * | 11/1999 | Koga et al. | 303/116.1 |
| 5,992,948 A | * | 11/1999 | Gowda | 303/116.1 |
| 6,113,197 A | * | 9/2000 | Kuroki et al. | 303/11 |
| 6,123,396 A | * | 9/2000 | Siegel | 303/116.1 |
| 6,217,129 B1 | * | 4/2001 | Ganzel | 303/11 |

* cited by examiner

Primary Examiner—Jack Lavinder
Assistant Examiner—Robert A. Siconolfi
(74) Attorney, Agent, or Firm—MacMillan, Sobanski & Todd, LLC

(57) ABSTRACT

A brake system includes a brake adapted to receive a brake fluid. The brake is in fluid communication with a brake fluid conduit. The brake system includes a pressure accumulator adapted to store the brake fluid under pressure. The pressure accumulator is in fluid communication with a supply conduit. The brake system includes a pump in fluid communication with the brake fluid conduit and the supply conduit. The brake system includes a bypass valve in fluid communication with the brake fluid conduit and the supply conduit. The bypass valve is positioned to allow the brake fluid to flow from the pressure accumulator to the brake without flowing through the pump.

5 Claims, 2 Drawing Sheets

BLEED VALVE WITH PUMP BYPASS FEATURE

TECHNICAL FIELD

This invention relates to an apparatus for improving response time of a vehicle stability control (VSC) brake system. This invention relates to an apparatus for evacuating an isolated circuit in a VSC brake system.

BACKGROUND OF THE INVENTION

Vehicles are commonly slowed and stopped with hydraulic brake systems. While these systems vary in complexity, a typical base brake system includes a tandem master cylinder, a fluid conduit arranged in two similar but separate brake circuits, and wheel brakes in each circuit. The master cylinder generates hydraulic forces in both brake circuits by pressurizing brake fluid when the driver steps on the brake pedal. The pressurized fluid travels through the fluid conduit in both circuits to actuate brake cylinders at the wheels and slow the vehicle.

Braking a vehicle in a controlled manner under adverse conditions requires precise application of the brakes by the driver. Under these conditions, a driver can easily apply excessive brake pressure thus causing one or more wheels to lock, resulting in excessive slippage between the wheel and road surface. Such wheel lock-up conditions can lead to greater stopping distances and possible loss of directional control.

Advances in braking technology have led to the introduction of anti-lock brake systems (ABS). An ABS monitors wheel rotational behavior and selectively applies and relieves brake pressure in the corresponding wheel brakes in order to maintain the wheel speed within a selected slip range while achieving maximum braking forces. While such systems are typically adapted to control the braking of each braked wheel of the vehicle, some systems have been developed for controlling the braking of only a portion of the braked wheels.

Electronically controlled ABS valves, comprising apply (isolation) valves and dump valves, are located between the master cylinder and the wheel brakes and perform the pressure regulation. Typically, when activated, these ABS valves operate in three pressure control modes: pressure apply, pressure dump and pressure hold. The apply valves allow brake pressure into the wheel brakes to increase pressure during the apply mode, and the dump valves release pressure from the wheel cylinders during the dump mode. Wheel cylinder pressure is held constant during the hold mode.

A further development in braking technology has led to the introduction of traction control (TC) systems. Additional valves have been added to existing ABS systems to provide a brake system that controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, braking pressures greater than the master cylinder pressure must quickly be available when the vehicle is accelerating.

During vehicle motion such as cornering, dynamic forces are generated which can reduce vehicle stability. A VSC brake system improves the stability of the vehicle by counteracting these forces through selective brake actuation. These forces and other vehicle parameters are detected by sensors that signal an electronic control unit. The electronic control unit automatically operates pressure control devices to regulate the amount of hydraulic pressure applied to specific individual wheel brakes. In order to achieve optimum vehicle stability, brake pressures greater than the master cylinder pressure may be required in a very short time. However, a brake system that generates high pressures very quickly typically has high power requirements or uses a large high pressure accumulator.

During installation of a brake system, an evacuation process removes air trapped in the system. In order to reduce installation time, it is desirable to perform an evacuation process without opening otherwise normally closed valves, particularly solenoid actuated valves which would require electrical connection. In a VSC system, it is desirable to also evacuate isolated circuits without electrically connecting supply valves. During operation of a motor vehicle using a VSC, it is desirable to bypass time-consuming pump assemblies when providing VSC control.

SUMMARY OF THE INVENTION

The above objects as well as other objects not specifically enumerated are achieved by a brake system. The brake system includes a brake adapted to receive a brake fluid. The brake is in fluid communication with a brake fluid conduit. The brake system includes a pressure accumulator adapted to store the brake fluid under pressure. The pressure accumulator is in fluid communication with a supply conduit. The brake system includes a pump in fluid communication with the brake fluid conduit and the supply conduit. The brake system includes a bypass valve in fluid communication with the brake fluid conduit and the supply conduit. The bypass valve is positioned to allow the brake fluid to flow from the pressure accumulator to the brake without flowing through the pump.

Various objects and advantages of this invention will become apparent to those skilled in the art from the following detailed description of the preferred embodiment, when read in light of the accompanying drawings.

DETAILED DESCRIPTION OF THE INVENTION

This invention relates in general to vehicular brake systems. In particular, this invention relates to a vehicle stability control (VSC) system having a bypass valve for evacuating air in an otherwise isolated circuit. This VSC system is adapted for use in an anti-lock brake system (ABS) and traction control (TC) brake system. More specifically, this invention relates to a bypass valve that permits fluid, stored in an accumulator, to be directed to the desired wheel brakes without passing through a pump assembly.

Figure 1:
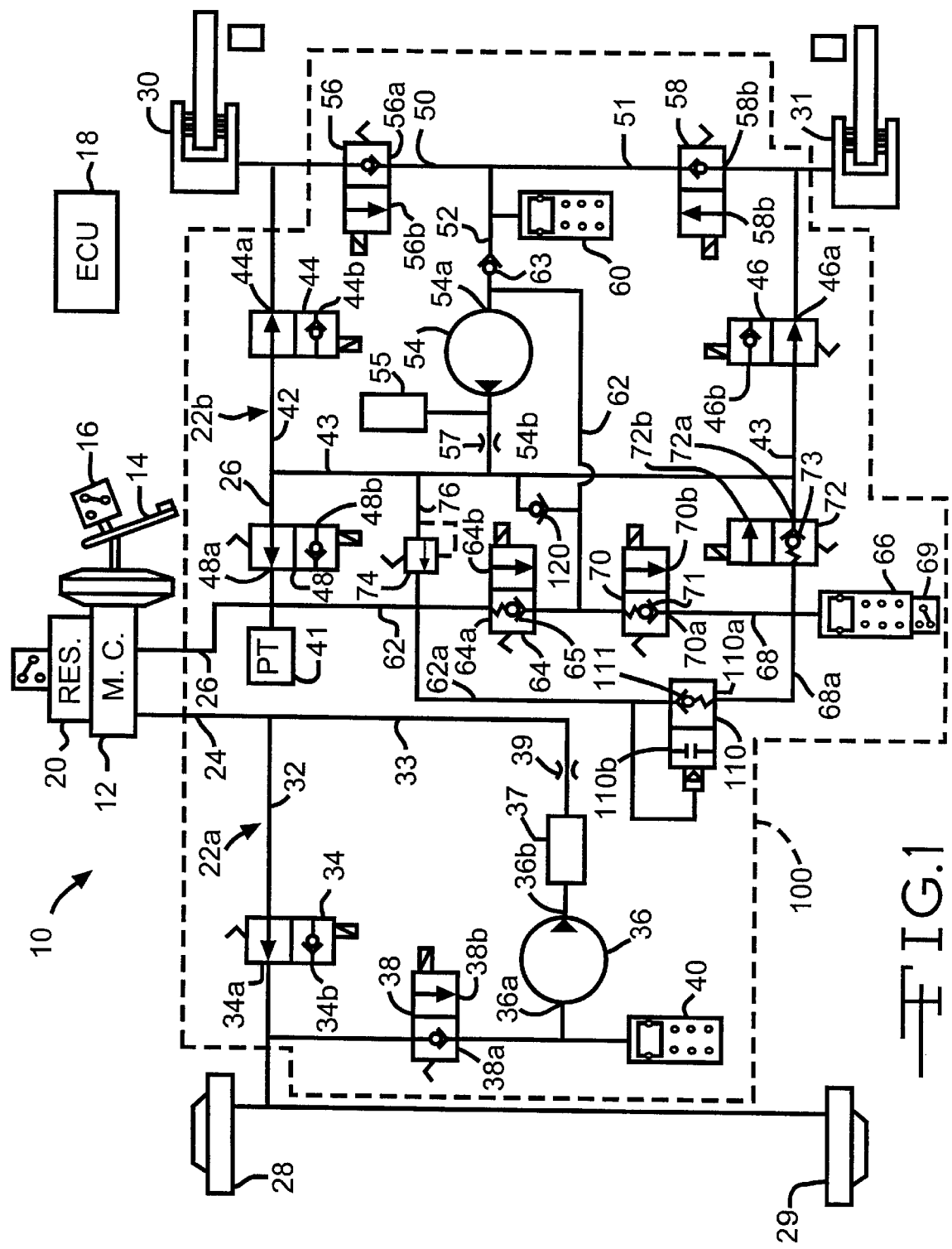
FIG. 1 is a schematic view of a hydraulic brake system..

FIG. 1 illustrates an ABS/TC/VSC brake system 10 according to this invention. The brake system 10 includes a tandem master cylinder 12 for pressurizing brake fluid when the driver steps on the brake pedal 14. A brake switch 16 is connected to the Electronic Control Unit (ECU) 18 to indicate that the driver is stepping on the brake pedal 14. A reservoir 20 is connected to the master cylinder 12 and holds a supply of brake fluid at atmospheric pressure. Two separate brake circuits 22a, 22b are connected to the master cylinder 12 via main fluid conduits 24 and 26 respectively. The brake system 10 is preferably configured as a vertical split system with brake circuit 22a having first and second wheel brakes 28 and 29 connected to the master cylinder 12 via the main conduit 24 and brake circuit 22b having first and second wheels brakes 30 and 31 connected to the master cylinder 12 via main conduit 26. The brake system 10 provides ABS control to all four wheel brakes 28–31 and brake circuit 22b provides VSC and traction control to the wheel brakes 30 and 31.

In brake circuit 22a, the main conduit 24 splits into two conduits 32 and 33. A normally open solenoid actuated 2-position, 2-way ABS isolation valve 34 is located in conduit 32 between the master cylinder 12 and the wheel brakes 28 and 29. The solenoid actuated isolation valve 34 has a first, open position 34a and a second position 34b having a one-way valve which allows fluid to flow from the wheel brakes 28 and 29 towards the master cylinder 12 but prevents flow in the opposite direction. A pump 36 having an inlet 36a and an outlet 36b is located in conduit 33. A 2-position, 2-way solenoid actuated dump valve 38 is located in conduit 33 between the wheel brakes 28 and 29 and the pump inlet 36a. A damping chamber 37 and restricting orifice 39 are located at the pump outlet 36b to reduce the pressure pulsations from the pump. A low pressure accumulator (LPA) 40 is located in conduit 33 between the pump 36 and the dump valve 38. The dump valve 38 has a first, one-way position 38a which prevents fluid from flowing from the wheel brakes 28 and 29 to the LPA 40 but allows fluid to flow in the opposite direction, and a second, open position 38b allowing flow in both directions.

In circuit 22b, a master cylinder pressure transducer 41 is located in conduit 26 and is connected to the ECU 18 to indicate the master cylinder pressure. The main brake conduit 26 splits into a brake fluid conduit 42 and a brake fluid conduit 43. The brake fluid conduit 42 is connected to the first wheel brake 30 and brake fluid conduit 43 is connected to the second wheel brake 31. A first normally open solenoid actuated 2-position, 2-way ABS isolation valve 44 is located in brake fluid conduit 42 between the first wheel brake 30 and the master cylinder 12. A second normally open solenoid actuated 2-position, 2-way ABS isolation valve 46 is located in brake fluid conduit 43 between the second wheel brake 31 and the master cylinder 12. The ABS isolation valves 44, 46 have a first open position 44a, 46a and a second position 44b, 46b having a one-way valve which allows fluid to flow from the wheel brakes 30 and 31 towards the master cylinder 12 but prevents flow in the opposite direction. A normally open solenoid actuated 2-position, 2-way traction control isolation valve 48 is located in conduit 26 between the master cylinder 12 and the ABS isolation valves 44 and 46. The traction control isolation valve 48 has a first open position 48a, and a second position 48b having a one-way valve which allows fluid to flow from the master cylinder 12 towards the wheel brakes 30 and 31 but prevents flow in the opposite direction.

Conduits 50 and 51 connect the first and second wheel brakes 30 and 31 respectively to a conduit 52 that is connected to brake fluid conduit 43. A pump 54 having an inlet 54a and an outlet 54b is located in conduit 52. A damping chamber 55 and restricting orifice 57 are located at the pump outlet 54b to reduce the pressure pulsations from the pump 54. A first 2-position, 2-way solenoid actuated dump valve 56 is located in conduit 50 between the wheel brake 30 and the connection with conduit 52. A second 2-position, 2-way solenoid actuated dump valve 58 is located in conduit 51 between the wheel brake 31 and the connection with conduit 52. A low pressure accumulator (LPA) 60 is located in conduit 52 between the pump 54 and the dump valves 56 and 58. The dump valves 56, 58 have a first, one-way position 56a, 58a which prevents fluid from flowing from the wheel brakes 30 and 31 to the LPA 60 but allows fluid to flow in the opposite direction, and a second, open position 56b, 58b allowing flow in both directions.

A supply conduit 62 is connected to the main brake conduit 26 between the traction control isolation valve 48 and the master cylinder 12. Fluid can flow from the master cylinder 12 through the main brake conduit 26 to reach the supply conduit 62 without traveling through a valve element. The supply conduit 62 is also connected to the pump inlet 54a for supplying the pump 54 with fluid. A 2-position, 2-way solenoid actuated supply valve 64 is located in the supply conduit 62 between the master cylinder 12 and the pump inlet 54a. The supply valve 64 has a first, one-way position 64a, in which a spring-loaded check valve 65 prevents fluid from flowing from the master cylinder 12 to the pump inlet 54a but allows fluid to flow in the opposite direction when the fluid reaches pressures of approximately 800 p.s.i. greater than the master cylinder pressure. The 800 p.s.i. pressure requirement may be different depending on system parameters. The supply valve 64 also has a second, open position 64b allowing flow in both directions. A one-way check valve 63 is located between the connection of the supply conduit 62 to conduit 52 and the LPA 60. The check valve 63 prevents fluid in the supply conduit 62 from flowing into the LPA 60, but allows fluid in the LPA 60 to flow towards the pump inlet 54a.

A medium pressure accumulator (MPA) 66 is located in a conduit 68. The conduit 68 is connected to the supply conduit 62. The MPA 66 stores fluid at pressures which are higher than a typical low pressure accumulator but which are lower than a typical high pressure accumulator. The MPA 66 is a pressure accumulator that preferably stores fluid between 40 p.s.i. and 400 p.s.i., however fluid may be stored at other suitable pressures. A switch 69 on the MPA 66 is connected to the ECU 18 to indicate whether or not the MPA is full of pressurized fluid.

A first control valve in the form of a 2-position, 2-way solenoid actuated priming valve 70 is located in conduit 68 between its connection to the supply conduit 62 and the MPA 66. The priming valve 70 has a first, one-way position 70a, in which a spring-loaded check valve 71 prevents fluid from flowing from the master cylinder 12 to the MPA 66 but allows fluid to flow in the opposite direction when the fluid reaches a pressure differential of approximately 1600 p.s.i. across the valve 71. The priming valve 70 also has a second, open position 70b allowing flow in both directions.

A second control valve in the form of a 2-position, 2-way solenoid actuated charging valve 72 is located in conduit 68 between the connection with brake fluid conduit 43 and the MPA 66. The charging valve 72 has a first, one-way position 72a, in which a spring-loaded check valve 73 prevents fluid from flowing from the MPA 66 towards the wheel brakes 30 and 31 but allows fluid to flow in the opposite direction when the fluid reaches a pressure differential of approximately 1600 p.s.i. across the valve. The 1600 p.s.i. pressure requirements needed to open the spring loaded check valves 71 and 73 may be different values depending on system parameters. The charging valve 72 also has a second, open position 72b allowing flow in both directions. A switchable solenoid valve is used rather than a check valve because by opening the charging valve 72 the MPA 66 can be charged by the pump 54 without creating a large load on the pump 54. Also, a solenoid valve is more contamination resistant in the fully open position than a spring loaded check valve used as a relief valve.

A bypass valve 74 is connected to conduits 43 and 62 and is connected in parallel to the traction control isolation valve 48. The bypass valve 74 prevents excessive pressure buildup by opening at approximately 2500 p.s.i. to allow pressurized fluid to flow back to the master cylinder 12 when the traction control isolation valve 48 is in the second position 48b. The opening pressure of the bypass valve 74 should be higher than the sum of the opening pressure of the spring loaded check valve 73 in the charging valve 72 plus the MPA pressure to keep fluid taken from the MPA 66 during VSC mode in the braking system (where it will be returned to the MPA 66) rather than being returned to the master cylinder 12.

During normal braking the driver actuates the base braking system by pushing on the brake pedal 14 which causes the master cylinder 12 to pressurize brake fluid. In circuit 22a, the pressurized brake fluid travels through conduits 24 and 32, through the open ABS isolation valve 34 and into the wheel brakes 28 and 29 to brake the vehicle. In circuit 22b, the pressurized brake fluid travels through conduits 26, 42 and 43, through the open ABS isolation valves 44 and 46 and into the wheel brakes 30 and 31 to brake the vehicle. When the driver releases the brake pedal, the master cylinder 12 no longer pressurizes the brake fluid and the brake fluid returns to the master cylinder 12 via the same route.

During ABS modes, the driver applies the brakes in a similar manner as during normal braking. When a wheel begins to slip, the pumps 36 and 54 run and pressurize fluid in circuits 22a and 22b. The ABS isolation valves 34, 44 and 46 and the ABS dump valves 38, 56 and 58 are pulsed to control the pressures at the wheel brakes 28, 29, 30, and 31.

The MPA 66 is filled, or charged, with pressurized fluid during a charging mode. The charging mode is initiated when the MPA switch 69 indicates that the MPA 66 is not full and the brake switch 16 and master cylinder pressure transducer 41 indicate that the driver is not requesting base braking by pushing on the brake pedal 14. The traction control isolation valve 48, and the first and second ABS isolation valves 44 and 46, are shuttled to their second positions 48b, 44b, and 46b to prevent pressurized fluid from reaching the master cylinder 12 and wheel brakes 30 and 31. The charging valve 72 is shuttled to the second position 72b to open a path between the pump outlet 54b and the MPA 66. The supply valve 64 is shuttled to the second position 64b to allow fluid from the master cylinder 12 to supply the pump inlet 54a. The pump 54 runs and pumps pressurized fluid into the MPA 66 until the MPA switch 69 indicates that the MPA 66 is full. When the MPA 66 is full, the pump 54 is turned off and the traction control isolation valve 48, ABS isolation valves 44 and 46, supply valve 64 and charging valve 72 are returned to the first positions 48a, 44a, 46a, 64a and 72a. The pressure of the fluid stored in the MPA 66 when it is full is approximately 400 p.s.i., although any suitable pressure can be used.

The spring loaded check valve 71 in the priming valve 70 provides a pressure relief function which prevents fluid expansion in a fully charged MPA 66 from generating pressures capable of damaging components. For example, if the temperature of the fluid in the fully charged MPA 66 should increase, the pressure in the MPA 66 will increase. The increased pressure will open the check valve 71 and the excess fluid will flow back to the master cylinder 12 through the check valves (not shown) located in the pump 54.

The brake system 10 provides VSC to the wheel brakes 30, 31 using circuit 22b to generate the necessary fluid pressures. VSC may be needed when the driver is applying the brakes or when the driver is not applying the brakes. Pressurized fluid stored in the MPA 66 is used to provide fluid flow rates which are greater than those available from a standard ABS/TC pump 54 to begin to fill the wheel brakes 30, 31. The pump 54 preferably provides a sustained supply of brake fluid to the wheel brakes 30, 31. When VSC is needed, the priming valve 70 is switched to the open position 70b to allow pressurized fluid to flow from the MPA 66 to the pump inlet 54a and wheel brakes 30, 31 by way of a bypass valve 120, further discussed below. The MPA 66 preferably provides an immediate pulse of brake fluid to the wheel brakes 30, 31. Thus, the pump 54 provides fluid at a higher pressure than otherwise possible to the wheel brakes 30, 31. VSC braking pressures are achieved by pulsing the isolation valves 44, 46 and dump valves 56, 58 to regulate pressures at the wheel brakes 30, 31. When the MPA 66 has discharged to a pressure below a predetermined pressure, the priming valve 70 is switched back to the one-way position 70a.

The valves and pumps are preferably mounted together in a hydraulic control unit (HCU) 100. The HCU 100 may be mounted in a remote location using longer conduits to connect it with the master cylinder 12. The longer conduits typically impart flow restrictions which lengthen the time required to charge the MPA 66, however, the time required to charge the MPA 66 is not critical.

During TC or when VSC is needed while the driver is not pushing the brake pedal 14, the traction control isolation valve 48 is shuttled to the second position 48b to prevent the pressurized fluid from reaching the master cylinder 12. The first and second ABS isolation valves 44 and 46 are also shuttled to the second positions 44b and 46b to prevent pressurized fluid from reaching the wheel brakes 30 and 31. The pump 54 is energized and pressurizes fluid. The ECU 18 selects the wheel to be braked and pressurized fluid is supplied to it by shuttling the priming valve 70 to the second, open position 70b and pulsing the corresponding ABS isolation valve 44 or 46 to the second, open position 44b or 46b. The pressurized fluid in the MPA 66 flows into the selected wheel brake 30 or 31 providing a rapid pressure increase. The spring loaded check valve 65 in the supply valve 64 holds pressure on the pump inlet 54a side of the supply valve 64 so that the fluid released from the MPA 66 by the priming valve 70 will not flow back to the master cylinder 12.

The pressure at the selected wheel brake 30 or 31 is increased in a controlled manner by pulsing the corresponding ABS isolation valve 44 or 46 open and closed. The pressure is decreased in a controlled manner by pulsing open the corresponding ABS dump valve 56 or 58, allowing some of the pressurized fluid in the wheel brake 30 or 31 to flow into the LPA 60. While the ABS isolation valve 44 or 46 is pulsed closed, the pressurized fluid in the LPA 60 is pumped through the spring loaded check valve 73 in the charging valve 72 to charge the MPA 66. Therefore, the amount of fluid stored in the LPA 60 is minimized to provide adequate storage requirements in case of transition to ABS. In addition, the amount of fluid stored in the MPA 66 is maximized to reduce the need to enter the MPA charging mode.

If the driver should apply the brakes during the TC or VSC mode just described (VSC without brake apply), some pedal movement will be experienced as the master cylinder 12 pressurizes the brake fluid in circuit 22a. However, the driver is isolated from the front wheel brakes 30 and 31 and some action must be taken in circuit 22b or the driver will experience an unusually high, hard brake pedal 14. When the pressure transducer 41 and the brake switch 16 indicate that the driver is applying the brakes during TC or VSC mode, the priming valve 70 remains in the first position 70a and the supply valve 64 is shuttled to the second position 64b. The pressurized fluid from the master cylinder 12 is supplied to the pump inlet 54a and the driver will experience brake pedal movement that is typical to normal base braking. When the MPA switch 69 indicates to the ECU 18 that the MPA 66 is full, the supply valve 64 is returned to the first position 64a.

When VSC mode is entered while the driver is already applying the brakes, the valve control is the same as in VSC without brake pedal apply except that the supply valve 64 is pulsed to the second, open position 64b instead of the priming valve 70. The driver will experience brake pedal movement typical of normal base braking and the pump inlet 54a is supplied with fluid. Further VSC control is similar to the VSC control without brake pedal apply described above. When the driver releases the brake pedal 14, the excess fluid in circuit 22b which was supplied by the master cylinder 12 is pumped back to the master cylinder 12 through the bypass valve 74. Since the master cylinder pressure may be at a relatively high pressure, the bypass valve 74 references atmospheric pressure and opens when the pressure at the pump outlet 54b reaches approximately 2500 p.s.i. above atmospheric pressure.

During a transition from ABS control to VSC control the traction control isolation valve 48 is shuttled to the second position 48b to allow pressures greater than master cylinder pressure to be achieved at the wheel brakes 30 and 31. Fluid may still be stored in the LPA 60 from the previous ABS mode, and this fluid is pumped through the bypass valves 74 and back to the master cylinder 12. Through proper control of the valves and utilizing information from the MPA switch 69, a consistent relationship of pedal travel to brake pressure can be maintained in all modes of operation.

During installation on a vehicle, the system 10 preferably undergoes an evacuation and fill process to eliminate air in the various conduits and fill them with hydraulic brake fluid. Conventional techniques for evacuation and fill are suitable for a portion of system 10. However, conduit 62 between the priming valve 70 and the pump 54 is not evacuated and filled due to the position of the check valve 63. In its position, the spring loaded check valve 63 prevents conventional techniques from evacuating air from and filling the conduit 62 with brake fluid.

Figure 2:
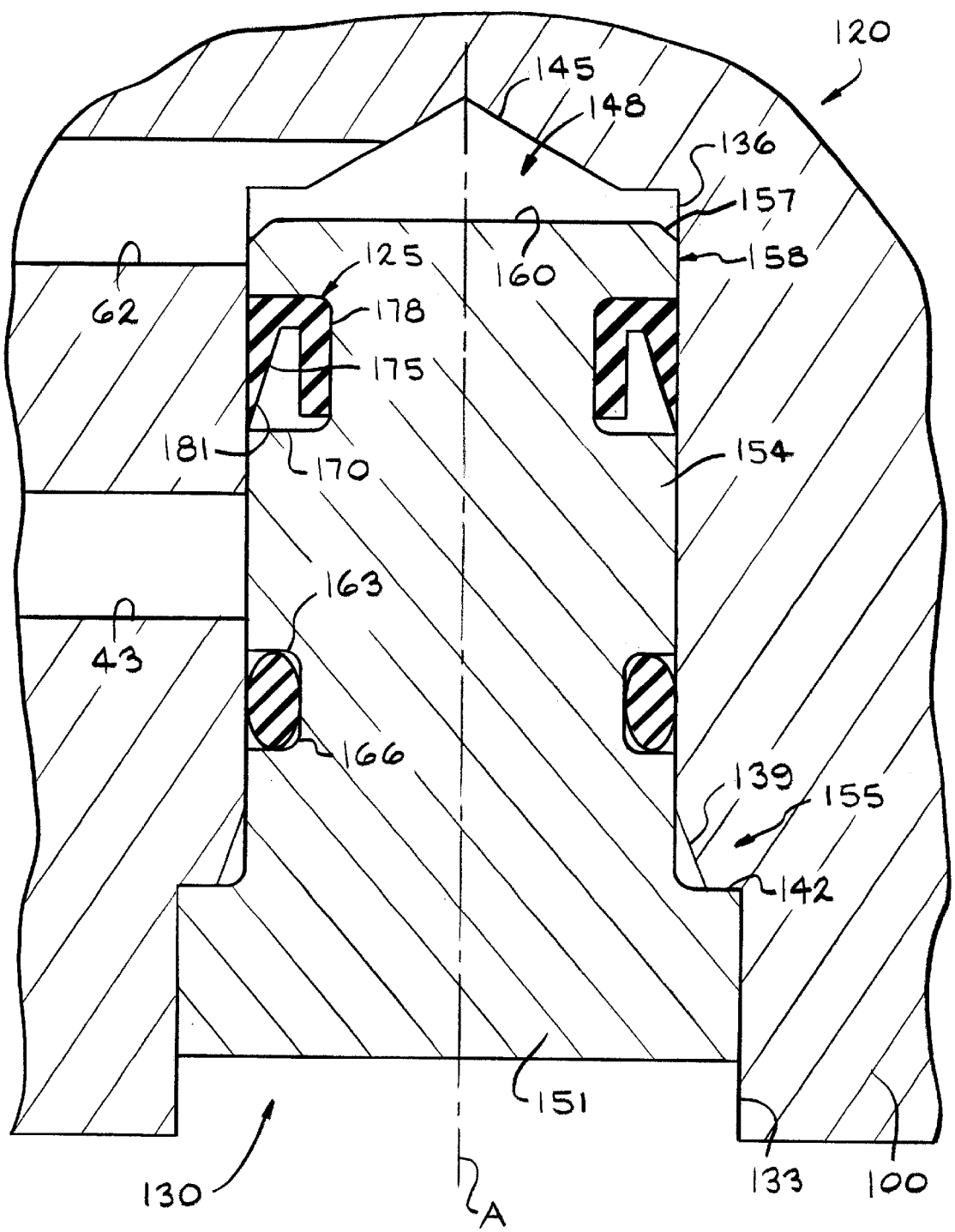
FIG. 2 is a cross-sectional elevational view of a bypass valve according to the invention.

Referring now to FIG. 2, a bypass valve 120 is provided in the system 10 to permit air evacuation in the conduit 62. The bypass valve 120 includes a one-way check valve 125 which allows fluid to flow from the supply conduit 62 to the brake fluid conduit 43 during VSC conditions. The brake fluid conduit 43 is in fluid communication with the main brake conduit 26 and the brake fluid conduit 42. The main brake conduit 26 splits into brake fluid conduit 42 and brake fluid conduit 43, both of which are preferably operatively connected to the first wheel brake 30 and to the second wheel brake 31, respectively. The check valve 125 substantially prevents fluid flow from the brake fluid conduit 43 to the supply conduit 62 through the bypass valve 120.

An opening 130 is provided in the HCU 100 to receive the bypass valve 120 along the longitudinal axis "A." The opening 130 preferably includes a wider portion 133 and a narrow portion 136. The opening 130 also includes an annular chamfer 139 between the wider portion 133 and the narrow portion 136 to allow for ease of insertion of the bypass valve 120 into the opening 130. A seat 142 is provided in the opening 130 on which to allow a portion of the bypass valve 120 to rest. The opening 130 also includes a terminal surface 145 which defines a chamber 148 in fluid communication with the supply conduit 62.

The bypass valve 120 preferably includes a wider portion 151 and a narrow portion 154. The wider portion 151 rests on the seat 142. The narrow portion 154 of the bypass valve 120 terminates at a first end 155 at the wider portion 151, and preferably includes an annular chamfer 157 at the second 158 end. The annular chamfer 157 of the narrow portion 154 allows for ease of insertion of the bypass valve 120 into the opening 130 past the annular chamfer 139 in the opening 130 provided in the HCU 100. The annular chamfer 157 terminates at a terminal surface 160 of the narrow portion 154.

In a preferred embodiment, a fluid seal 163 is received in an annular groove 166 formed in the narrow portion 154 of the bypass valve 120. The fluid seal 163 is preferably a ring and may be made of any suitable material. The fluid seal 163 prevents significant fluid flow, and preferably prevents all fluid flow, from the brake fluid conduit 43 past the narrow portion 154, the annular chamfer 139 in the opening 130, and the wider portion 151 of the bypass valve 120.

The check valve 125 is preferably provided in a groove 170 in the narrow portion 154 of the bypass valve 120. The check valve 125 is provided between the supply conduit 62 and the brake fluid conduit 43, both of which preferably terminate at the opening 130 in the HCU 100. The check valve 125 includes a lip 175 operatively connected to a body 178. A narrow portion 181 of the lip 175 deflects toward the body 178 of the check valve 125 when sufficient pressure is applied from fluid in the supply conduit 62, thus allowing fluid from the supply conduit 62 past the check valve 125 into the brake fluid conduit 43 and to the first wheel brake 30 and to the second wheel brake 31.

By use of the bypass valve 120, fluid, including air, can be eliminated from an isolated circuit of the system 10. The isolated circuit preferably includes the MPA 66. The fluid is eliminated by connecting a vacuum (not shown) to the brake fluid conduit 43 proximate the bypass valve 120. When the vacuum is so connected and operating, pressure in the supply conduit 62 is higher relative to the brake fluid conduit 43. The fluid thus passes from the supply conduit 62 into the chamber 148, and past the narrow portion 181 of the lip 175 of the check valve 125. The fluid then passes into the brake fluid conduit 43.

By use of the bypass valve 120, brake fluid can be directed from the MPA 66 to the first wheel brake 30 and to the second wheel brake 31, without first passing through the pump 54. In response to a VSC event, fluid flows from the MPA 66 to the supply conduit 62. The fluid then passes from the supply conduit 62 into the chamber 148, and past the narrow portion 181 of the lip 175 of the check valve 125. The fluid then passes into the brake fluid conduit 43. From the brake fluid conduit 43, the fluid can also pass into the brake fluid conduit 42 and to the first wheel brake 30 and to the second wheel brake 31.

The principle and mode of operation of this invention have been described in its preferred embodiments. However, it should be noted that this invention may be practiced otherwise than as specifically illustrated and described without departing from its scope.

What is claimed is:

1. A brake system comprising:
 a brake adapted to receive a brake fluid, wherein the brake is in fluid communication with a brake fluid conduit;
 a pressure accumulator adapted to store the brake fluid under pressure, wherein the pressure accumulator is in fluid communication with a supply conduit;
 a pump in fluid communication with the brake fluid conduit and the supply conduit; and
 a bypass valve in fluid communication with the brake fluid conduit and the supply conduit, the bypass valve being positioned to allow the brake fluid to flow from the pressure accumulator to the brake without flowing through the pump.

2. The brake system of claim 1 wherein the pressure accumulator is a medium pressure accumulator, the pressure accumulator storing fluid having a pressure within the range of from about 40 psi to about 400 psi.

3. The brake system of claim 1, the bypass valve further comprising a one-way check valve.

4. The brake system of claim 1 wherein the pressure accumulator provides an immediate pulse of brake fluid to the brake.

5. The brake system of claim 1 wherein the pump provides a sustained supply of brake fluid to the brake.

* * * * *